Jan. 23, 1934.   R. L. ROGERS   1,944,810
SANITARY ATTACHMENT FOR BEVERAGE VENDING MACHINES
Filed April 24, 1930   2 Sheets-Sheet 1
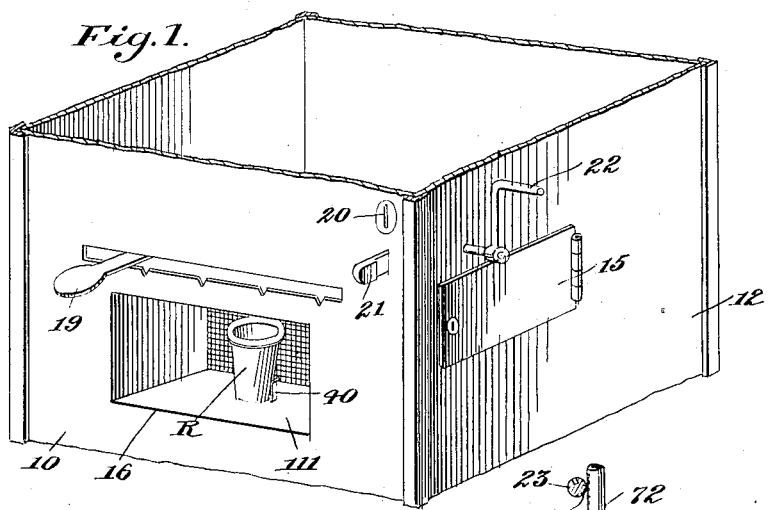
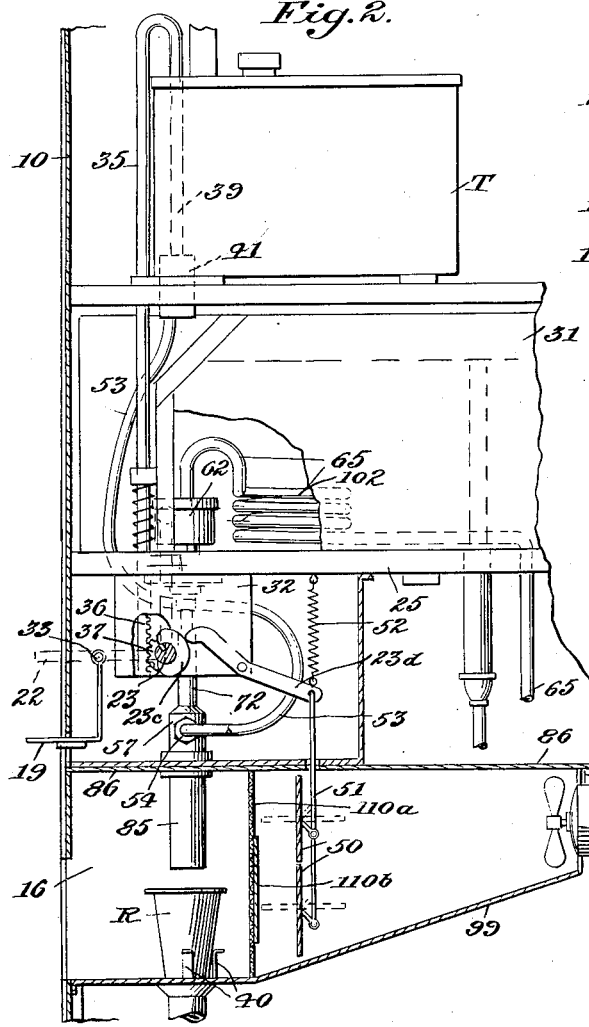
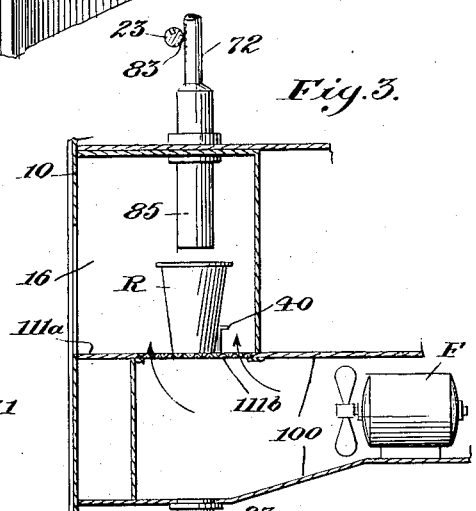
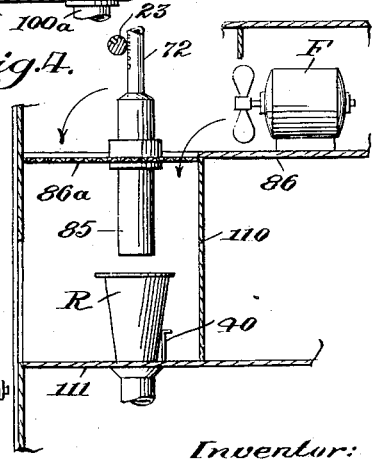
Inventor:
Ralph L. Rogers, Jan. 23, 1934.    R. L. ROGERS    1,944,810
SANITARY ATTACHMENT FOR BEVERAGE VENDING MACHINES
Filed April 24, 1930    2 Sheets-Sheet 2
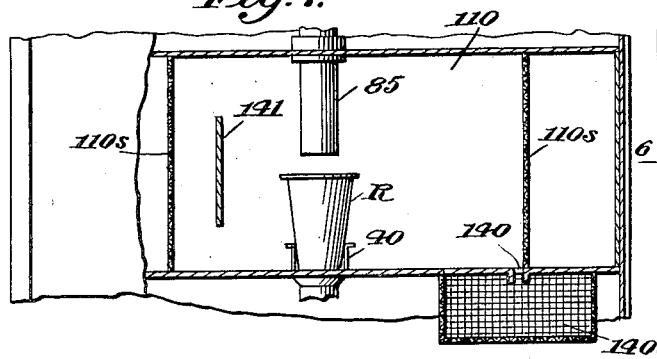
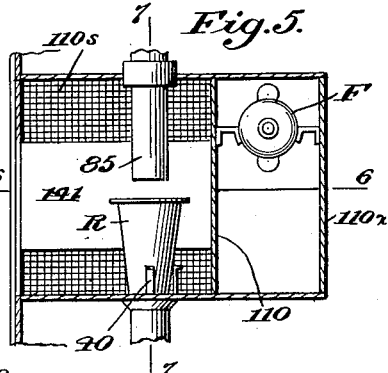
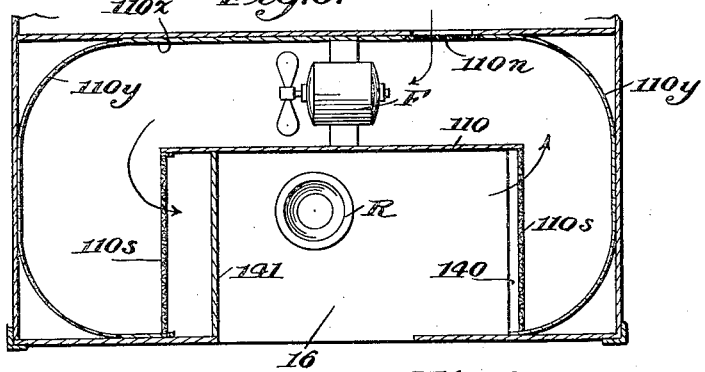
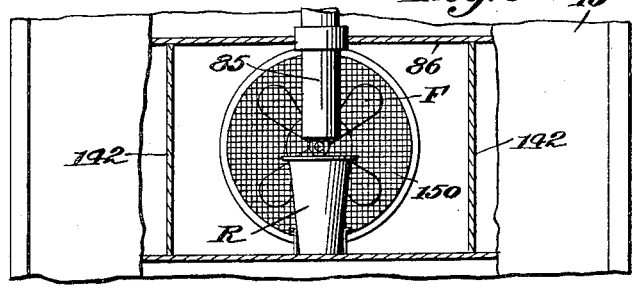
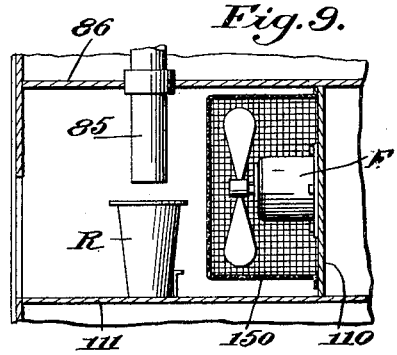
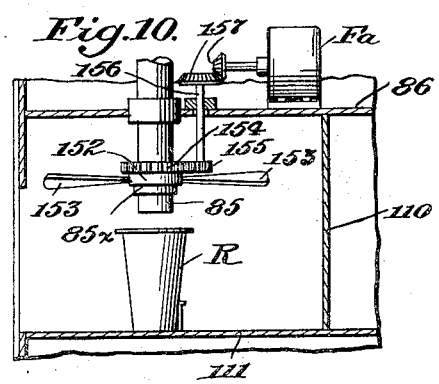
Inventor:
Ralph L. Rogers,
by
Attys.

Patented Jan. 23, 1934

UNITED STATES PATENT OFFICE 1,944,810

SANITARY ATTACHMENT FOR BEVERAGE VENDING MACHINES

Ralph L. Rogers, Knoxville, Tenn., assignor to The General Automatic Merchandising Corporation, a corporation of Delaware Application April 24, 1930. Serial No. 447,057

13 Claims. (Cl. 225—21)

The present invention relates to improvements in beverage vending machines, and more particularly proposes to provide a fan attachment for preventing the alighting of insects upon certain parts of such machines.

In my co-pending application Serial No. 423,842, filed January 27, 1930, I have disclosed a beverage vending machine in which a mixed beverage is prepared by the delivery of a predetermined quantity of a flavoring syrup, and a predetermined quantity of mixing liquid, such as carbonated water, upon the deposit of a coin. In the machine described in said application, the enclosing casing is provided with a recess having a support for the receptacle intended to receive a beverage, and into this recess projects the lower end of a mixing chamber. When employed on certain locations, such a machine is subject to the disadvantage that flies, bees, moths and other insects are attracted by any spilled or splashed or remaining beverage, and their presence is repugnant to a tentative customer.

According to the present invention, means are provided for preventing the entry and alighting of such insects upon the parts concerned. While the device is illustrated in conjunction with the representation of a machine according to my said application, it will be understood that it is in no wise limited thereto.

One of the objects of the present invention, therefore, is to provide a beverage dispensing machine in which the access of insects is prevented, without obscuring or obstructing the withdrawal of the filled receptacle.

Another object of the invention is to provide means for establishing a draft or current of air in and through the recess whereby to prevent the alighting of insects.

A further feature of the invention is to provide means for preventing the movement or overturning of the empty receptacle pending the dispensing operation, by reason of such an air current.

With these and other objects in view, as will appear in the course of the following specification and claims, forms of practicing the invention have been set forth in the accompanying drawings, in which—

Figure 1 is a fragmentary perspective view of a portion of the casing of a beverage vending machine;

Fig. 2 is a vertical sectional view through such a machine;

Fig. 3 is a corresponding sectional view through a machine in which a modified form of the invention is employed;

Fig. 4 is a corresponding sectional view through a machine employing a further modified form of the invention;

Fig. 5 is a corresponding sectional view through a machine in which a further modified form is employed;

Fig. 6 is a sectional view on the line 6—6 of Fig. 5; and

Fig. 7 is a sectional view on the line 7—7 of Fig. 5.

Fig. 8 is a front elevation of another modified form of the machine, with portions broken away for clearness.

Fig. 9 is a vertical sectional view substantially on line 9—9 of Fig. 8.

Fig. 10 is a vertical sectional view of a still further modified form of the invention.

In the drawings, a beverage dispensing machine is illustrated as having the front wall 10 and the side wall 12, in conjunction with a recess 16 opening through the front wall 10, and a selecting device 19 for determining the particular one of a number of flavors of syrup which is to be employed for the dispensing operation, for example, as illustrated in my co-pending application Serial No. 423,842, set forth above. This illustrated form of the device likewise includes a coin slot 20 for the introduction of the token, and a plunger knob 21 for the introduction of this inserted coin into the control mechanism of the machine, whereby a handle 22 is liberated and may then be manually operated to produce the dispensing sequence. The coins are received within the casing, and may be removed through the normally locked door 15. These features of the invention have been set forth and claimed in my aforesaid application, and are referred to as an example of the machine to which the present invention may be applied.

In Fig. 2, the front wall 10 has its recess 16 formed of a top wall 86, the floor 111 and a rear wall 110ª which is preferably of netting, so that it forms a guard grating preventing the projection of any insects from the interior of the machine into the recess 16, and also serving as a guard to prevent injury by contact with any of the mechanical structures located behind the same, such as the fan F. The handle shaft 23 is provided with teeth 83 (as in Figs. 3 and 4), to engage the sleeve member 72 which is slidable at its lower end in the upper part 57 of the mixing chamber, and at its upper end is slidable in a bushing 69, and is provided with means operating in the water measuring chamber 62 in the manner described in my said application, whereby an upward movement of the sleeve 72, causes the delivery of a predetermined quantity of mixing liquid into the upper end 57 of the mixing chamber. The water measuring chamber 62 is connected by a pipe 65 to a source of supply of carbonated water, this pipe being located in the casing 31 whereby the carbonated water may be refrigerated before it is measured and dispensed. The mixing flavors are located in tanks T, each of which is provided with a measuring chamber 41 operated by a portion 39 of a rectilinearly movable plunger arm 35, which at its lower end is provided with teeth for engagement with a selecting pinion 37 keyed on the shaft 23 but movable therealong by a selector member 47 operated from the exterior by a handle 19. The selector member serves to move the pinion 37 along the shaft 23 until it is engaged with the selected one of the plungers 35 corresponding to the syrup flavor to be dispensed, so that during the counter-clockwise rotation of shaft 23 during the dispensing cycle, the selected plunger 35 is pulled downward and operates in the measuring chamber 41 to cause a predetermined quantity of liquid to be forced downward in the pipe 53 and into the measuring chamber through a foot valve 54. These features of the machine have likewise been disclosed and claimed in my co-pending application Serial No. 423,842, and permit the delivery of a predetermined quantity of syrup and mixing liquid into and through the mixing chamber 85 into a receptacle R positioned on the floor 111.

The fan F is shown as mounted on the rearward extension of the horizontal plate member 86, and is connected electrically to a suitable source of power whereby it is driven and produces an air current toward the grating 110$^a$, and hence through the recess 16 to the exterior, of sufficient intensity to prevent the entry of insects into the recess 16, and hence the insects cannot alight on the lower lip of the mixing chamber 85, or discharge spout of the mixing chamber, for example, and contaminate this spout, nor upon the floor 111 or other walls of the recess.

When a cup or other receptacle R is placed in position beneath the mixing chamber 85, it is desirable that the air current from the fan F shall not overturn or move the receptacle. For this purpose, a series of guide fingers 40 are provided on the floor 111 and project upwardly in close conformation to the lower end of the receptacle, and therefore, support the latter against movement or overturning while empty. To assist in this action, a guard plate 110$^b$ is provided opposite the upper end of the receptacle. Walls 99 are preferably provided to form a wind tunnel from the fan F, so that the air current is directed against and through the grating 110$^a$.

Under some conditions, the air current encountering the lower end of the mixing chamber 85 may blow foam or froth therefrom, and even from the cup R itself, or blow particles from the falling stream of beverage entering the cup R. To avoid this, the movable louvres or valve members 50 are mounted on horizontal axes in the path of the air current from the fan F, and are connected by a link 51 and a spring 52 to the upper wall 25, so that the spring tends constantly to hold the louvres 50 open. The shaft 23 is provided with a cam 23$^c$ which engages a lever 23$^d$ pivotally mounted on the journal bracket 32. So long as the shaft 23 is in the un-operated position illustrated in Fig. 1, the lever 23$^d$ holds the spring 52 under tension, and maintains the louvres 50 open, so that the air current from the fan F passes through and into the recess 16. So soon, however, as the shaft 23 is moved away from its un-operated position, the cam 23$^c$ releases the lever 23$^d$, and the latter now permits the spring 52 to close the louvres 50, so that the air current is obstructed during the moment of dispensing and the blowing of foam is prevented.

In the form of construction shown in Fig. 3, the floor 111$^a$ of the recess 16 is provided with a netting or grating 111$^b$ and a wind tunnel is formed by the walls 100, whereby the current of air from the fan F is caused to flow upwardly through the grating 111$^b$ and thus into the recess 16 and out of the same, so that again the entry of insects and their alighting upon either the discharge or spout end of the mixing chamber 85, and upon the floor 111$^a$ and the grating 111$^b$ is prevented. In this form of construction, it is preferred to slope the walls 100 to lead to a drain 100$^a$ for any spilled liquid.

In the form of construction shown in Fig. 4, the floor 111 and the rear wall 110 are closed, while a portion of the upper wall 86 is provided with gratings 86$^a$, and the air current from the fan F is caused to pass downward through these gratings and around the mixing chamber 85 and receptacle R to emerge from the recess 16 as before.

In the modification, according to Figures 5, 6 and 7, the recess 16 is provided with a closed rear wall 110, and an auxiliary rear wall 110$^x$ spaced therefrom, with ends 110$^y$ joining this latter wall to the front wall 10 of the casing. The side walls 110$^s$ of the recess 16 are formed as gratings, so that the air current from the fan F passes in substantially continuous circulation in the space between the walls 110 and 110$^x$, then through gratings 110$^s$, thence across the recess 16, a part of the air possibly escaping from the recess, while the remaining portion passes through the other grating 110$^s$ to return in the circuit. A screened inlet 110$^n$ may be provided adjacent the fan F for compensating the loss of air which has passed to the outside from the recess 16. The air current in this case likewise passes across the recess 16 and prevents the alighting of insects on the discharge spout of the mixing chamber 85 or upon the receptacle R, which may again be held in position by the retaining fingers 40.

As illustrated in Figs. 6 and 7, an aperture 140 may be provided adjacent the lower end of the grating 110$^s$ through which the air passes toward the fan F, so that any insects which may be in the recess 16, and are carried by the air current against this grating 110$^s$, enter the slot 140 and are collected in a trap 140$^a$.

In this form, also, a baffle wall 141 is shown to be located opposite the lower end of the spout 85 and upper end of the receptacle R, to prevent the blowing of foam from the stream entering the receptacle R.

In the form of execution shown in Figs. 8 and 9, the recess has the bottom wall 111, the top wall 86 and the rear wall 110 which are closed. A fan F is mounted on the rear wall, but is surrounded by a drum-shaped netting guard 150 to prevent the contact of the hand with this fan. The air thus passes into the recess adjacent its sides, along the side walls 142 and is then caught by the fan and driven out of the machine again. Not only the actual blast of air from the fan F, but also the whirling of the fan blades may be employed in repelling the flies.

In the form of execution of Fig. 10, the motor Fa is mounted above the top wall 86 of the recess which has the rear wall 110 and the floor 111 as before, while on the discharge spout 85 is provided a fixed wall 85$^x$ upon which rests the hub 152 having the paddle blades 153 and a gear 154 which is in mesh with a pinion 155 on a shaft 156 which is connected by the bevel gears 157 with the shaft on the motor Fa. The gear 150 reduction is such that the speed of movement of the paddles 153 is slow, and merely a gentle blast of air, at most, is employed. The whirling of these blades, however, repels the flies so that they do not alight upon the lower lip of the discharge spout 85. The speed of movement of the paddles 153 is so slow that there is no danger of accident.

It is obvious that the invention is not limited to the formation of construction shown, but that it may be modified and applied in many ways within the scope of the appended claims.

Having thus described the invention, what I claim as new and desire to secure by Letters-Patent, is

1. A device of the class described comprising the combination with a casing, a receptacle support on said casing, and means for dispensing a liquid beverage and including a spout positioned above the support whereby it is adapted to discharge into a receptacle on said support, of a fan located within the casing for directing a current of air around said spout to prevent the alighting of insects thereon, and air conduit means in said casing for guiding the air current toward said spout.

2. A device of the class described comprising the combination with a casing, a receptacle support on the said casing, and means for dispensing a liquid beverage into a receptacle on said support, of a fan located within the casing for directing a current of air over said support to prevent the alighting of insects thereon, and air conduit means in said casing for guiding the air current toward said support.

3. A device of the class described, comprising the combination with a casing having a recess provided with a floor for supporting a receptacle, and means located within the casing for dispensing a liquid beverage and including a discharge spout positioned above said floor whereby it is adapted to discharge into a receptacle on said floor, of a fan located within the casing for directing a current of air through said recess to prevent the entry of insects thereinto, and air conduit means in said casing for guiding the air current through said recess.

4. A device of the class described comprising the combination with a casing having walls defining a recess open to the exterior of the casing, one of said walls providing a support for a receptacle and another of said walls being a grating, of a fan mounted in said casing for directing a current of air through said grating into said recess whereby to prevent the entry of insects thereinto.

5. A device as in claim 4 including walls within the casing for providing a wind tunnel between said fan and grating.

6. A device of the class described comprising the combination of a casing having walls defining a recess open to the exterior of the casing, the innermost of said walls being a grating, and a receptacle support located in said recess, of a fan mounted in said casing for directing a current of air through said grating over said support and out of said recess whereby to prevent the entry of insects into said recess.

7. A device of the class described comprising the combination with a casing, a receptacle support on said casing, means located within the casing for dispensing a liquid beverage and including a discharge spout positioned above said support whereby it is adapted to discharge into a receptacle placed on said support, of a fan located in the casing for directing a current of air around said spout to prevent the alighting of insects thereon, and a guard positioned between the fan and receptacle for obstructing the air current whereby to prevent the overturning of the receptacle by the air current from the fan.

8. A device of the class described comprising the combination of a casing, a receptacle support on said casing, means within the casing for dispensing a liquid beverage and including a discharge spout positioned above the support whereby it is adapted to discharge into a receptacle placed on said support, of a fan located in the casing for directing a current of air around said spout to prevent the alighting of insects thereon, and an air current regulator operated from the dispensing means for obstructing the air current during dispensing whereby to prevent the blowing of foam from the spout and receptacle.

9. A device of the class described comprising the combination with a casing, a receptacle support on said casing, and means including a discharge spout for dispensing a liquid beverage into a receptacle on said support, of a fan located in the casing for directing a current of air around said spout and over said support to prevent the alighting of insects thereon, air conduit means in said casing for guiding the air current toward said spout and over said support, and said retaining means to hold a receptacle on said support whereby to prevent the overturning of the receptacle by the air current from the fan.

10. A device of the class described, comprising in combination with a casing, a receptacle support on said casing, means for dispensing a liquid beverage into the receptacle on said support and including a discharge element, air moving means for directing a current of air against said discharge element, and means operatively connected with said dispensing means for interrupting said current during the dispensing operation whereby to prevent deflection of the discharged liquid by said current.

11. A device of the class described, comprising in combination with a casing, a liquid discharge pipe having a downwardly directed nozzle, of a rotatable fly repelling member located on the nozzle, and means for driving said member, said member operating when driven to repell insects from alighting on said nozzle.

12. A device of the class described, comprising in combination with a casing, a receptacle support on said casing, and means for dispensing a liquid beverage and including a spout positioned above the support whereby it is adapted to discharge into a receptacle onto said support, of a fan, and air conduit means connected to said casing for guiding the air current from said fan toward said spout.

13. A device of the class described, comprising in combination with a casing, a receptacle support on said casing, and means for dispensing a liquid beverage and including a spout positioned above the support whereby it is adapted to discharge into a receptacle onto said support, of means for passing a current of air downward along said spout toward said support.

RALPH L. ROGERS.